US009156701B2

(12) United States Patent
Ho et al.

(10) Patent No.: US 9,156,701 B2
(45) Date of Patent: Oct. 13, 2015

(54) FUNCTIONALISED GRAPHENE OXIDE (75) Inventors: Peter Ho, Singapore (SG); Lay-Lay Chua, Singapore (SG); Shuai Wang, Singapore (SG); Perq-Jon Chia, Singapore (SG); Ghim Siong Goh, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 640 days.

(21) Appl. No.: 12/735,328

(22) PCT Filed: Jan. 3, 2009

(86) PCT No.: PCT/SG2009/000001
§ 371 (c)(1),
(2), (4) Date: Oct. 25, 2010

(87) PCT Pub. No.: WO2009/085015
PCT Pub. Date: Jul. 9, 2009

(65) Prior Publication Data
US 2011/0052813 A1      Mar. 3, 2011

Related U.S. Application Data (60) Provisional application No. 61/018,751, filed on Jan. 3, 2008.

(51) Int. Cl.
*C01B 31/04*        (2006.01)
*B82Y 30/00*        (2011.01)
(Continued)

(52) U.S. Cl.
CPC .............. *C01B 31/0476* (2013.01); *B82Y 30/00* (2013.01); *B82Y 40/00* (2013.01); *C01B 31/043* (2013.01);
(Continued)

(58) Field of Classification Search
CPC .... C01B 31/04; C01B 31/0423; C01B 31/043
USPC ....................................... 423/448; 252/378 R
See application file for complete search history.

(56) References Cited

U.S. PATENT DOCUMENTS

2003/0186059 A1    10/2003   Hirata et al.
2005/0077503 A1    4/2005    Gotou et al.
2007/0092432 A1*   4/2007    Prud'Homme et al. ...... 423/448

OTHER PUBLICATIONS

Stankovich et al., "Synthesis and exfoliation of isocyanate-treated graphene oxide nanoplatelets," 2006, 44, 3342-3347.*

(Continued)

*Primary Examiner* — Richard M Rump
(74) *Attorney, Agent, or Firm* — John P. White; Cooper & Dunham LLP (57) ABSTRACT

A functionalised graphene oxide and a method of making a functionalized graphene oxide comprising: (i) oxidizing graphite to form graphite oxide wherein the graphene sheets which make up the graphite independently of each other have a basal plane fraction of carbon atoms in the $sp^2$-hybridised state between 0.1 and 0.9, wherein the remainder fraction comprises $sp^3$-hybridised carbon atoms which are bonded to oxygen groups selected from hydroxyl and/or epoxy and/or carboxylic acid; and (ii) exfoliating and in-situ functionalizing the graphite oxide surface with one or more functional groups such that fictionalization of the surface is effected at a concentration greater than one functional group per 100 carbon atoms and less than one functional group per six carbon atoms. The functionalized graphene oxide is dispersible at high concentrations in appropriate solvents without aggregating or precipitating over extended periods at room temperature.

20 Claims, 2 Drawing Sheets (51) Int. Cl.
*B82Y 40/00* (2011.01)
*C09D 5/24* (2006.01)

(52) U.S. Cl.
CPC .............. *C01B 31/0484* (2013.01); *C09D 5/24* (2013.01); *C01B 2204/02* (2013.01); *C01B 2204/28* (2013.01); *C01B 2204/30* (2013.01)

(56) References Cited

OTHER PUBLICATIONS

Lettow, J., et al. "Graphene in NLO Devices for High Energy Laser Protection". Defense Technical Information Center. 2010.*
International Search Report issued by the International Searching Authority (ISA/US) on Feb. 19, 2009 in connection with International Application No. PCT/SG2009/000001.
Bourlinos, A. B. et al. (2003). Graphite Oxide: chemical reduction to graphite and surface modification with primary aliphatic amines and amino acids. Langmuir, 19, 6050-6055.
Stankovich et al. (2006). Stable aqueous dispersions of graphitic nanoplatelets via the reduction of exfoliated graphite oxide in the presence of poly(sodium 4 styrenesulfonate). Journal of Materials Chemistry, 16, 155-158.
Stankovich et al. (2006). Synthesis and exfoliation of isocyanate-treated graphene oxide nanoplatelets. Carbon, 3342-3347.
Chua, L. et al. (2008). Deoxidation of graphene oxide nanosheets to extended graphenites by "unzipping" elimination. Journal of Chemical Physics, 129, 114702.
Wang, S. (2008). Band-like transport in surface-functionalized highly solution-processable graphene nanosheets. Advanced Materials, 20, 3440-3446.
Niyogi, S. (2006). Solution properties of graphite and graphene. Journal of the American Chemical Society, 128, 7720-7721.

* cited by examiner

FUNCTIONALISED GRAPHENE OXIDE

This application is a §371 national stage of PCT International Application No. PCT/SG2009/000001, filed Jan. 3, 2009, and claims the benefit of U.S. Provisional Application No. 61/018,751, filed Jan. 3, 2008, the contents of which are hereby incorporated by reference into this application.

FIELD OF THE INVENTION

The present invention relates to graphene like materials including functionalised graphene oxide and a method of preparing stable dispersions of fully dispersed functionalised nanosheets of these materials with the option of subsequently converting them to graphene for use in electronic applications. The nanosheet may contain or comprise a single layer of functionalised graphene oxide.

BACKGROUND OF THE INVENTION

Graphene is a flat monolayer of carbon atoms tightly packed into a two-dimensional (2D) honeycomb lattice. It can be wrapped up into 0D fullerenes, rolled into 1D nanotubes or stacked into 3D graphite. Graphenes are attracting renewed interest recently due to the advances in micromechanical exfoliation and epitaxial growth methods that make macroscopic two-dimensional sheets of $sp^2$-hybridised carbon atoms available for fundamental research. Sheets comprising a single layer and a few layers of graphene have been grown epitaxially by chemical vapour deposition of hydrocarbons on metal substrates for example Pt (Land, et al, STM investigation of single layer graphite structures produced on Pt(111) by hydrocarbon decomposition. *Surf. Sci.*, 264, 261-270 (1992)) and TiC (Itoh et al, Scanning tunneling microscopy of monolayer graphite epitaxially grown on a TiC(111) surface. *Surf. Sci. Lett.*, 254, L437-L442 (1991)), or by thermal decomposition of SIC (Bommel, A. J. V. et al., Leed and auger electron observations of the SiC(0001) surface. *Surf. Sci.*, 48 463-472 (1975); Berger, C. et al. Ultrathin epitaxial graphite: 2D electron gas properties and a route toward graphene-based nanoelectronics. *J. Phys. Chem. B,* 108 19912-19916 (2004); Berger, C. et al. Electronic confinement and coherence in pattern epitaxial graphene. *Science,* 312, 1191-1196 (2006)). However, these methods are substrate specific and therefore cannot be formed on substrates of general interest to semiconductor electronics. They also require a high temperature post-anneal step to develop the graphene structure.

There have also been attempts to grow graphene by adopting the same approach as that used in growing carbon nanotubes involving, for example, the pyrolysis of hydrocarbons (heavy oil) in a carbon arc (Krishnan, A. et al. Graphitic cones and nucleation of curved carbon surfaces. *Nature,* 388, 451-454 (1997); Dujardin, E., et al., Fabrication of mesoscopic devices from graphite microdisks. *Appl. Phys. Lett.*, 79, 2474-2476 (2001)). In order to improve the crystallinity of the resulting microstructures, a post anneal step of typically above 2000° C. is required. This approach produces graphite stacks containing typically 60 to 100 layers of graphene sheets. This approach produces thick graphite aggregates, but not single or few-layer sheets of interest for electronic or mechanical applications. Further, all of the approaches mentioned above require a high temperature process step (>1000° C.) which limits their application in producing organic electronic devices.

Attempts have also been made to isolate graphene sheets from graphite by first intercalating with an oxidising acid and reintercalating with alkali metal under heating, for hours, followed by reaction with ethanol. However, this results in partially exfoliated structures of thick aggregated stacks of graphene sheets (Viculis, et al., Intercalation and exfoliation routes to graphite nanoplatelets. *J. Mater. Chem.,* 15, 974-978 (2005)) that are not so suitable for subsequent processing or for electronic applications.

Novoselov et al (Novoselov, K. S. et al. Electrical field effect in atomically thin carbon films. *Science,* 306, 666-669 (2004)) obtained graphene sheets containing a single and a few layers of graphene by mechanical exfoliation (repeat peeling) of small mesas of highly oriented pyrolytic graphite (HOPG) and transferring these onto a desired substrate. This approach, however, presents considerable challenges for up-scaling to large substrate areas, or for producing bulk quantities of graphenes.

It would be advantageous to be able to make solution-processable or solution-dispersible graphene sheets. It would also be advantageous if said graphene sheets could be readily deposited onto desired substrates and/or electrode structures at room temperature or at slightly elevated temperatures.

Graphite oxide (GO) is a potential precursor to graphene upon thermal de-oxidation or chemical reduction. Although GO itself has been studied for over a century, its structure and properties remain elusive, and significant progress towards dispersability, the first step for applications, has been made only recently. It would certainly be very desirable to be able to solution-process these materials, for example by printing; thus opening opportunities for electronics on large and/or flexible substrates that take advantage of the 2D nature of these materials.

Graphite can be converted into graphite oxide in an aqueous medium (for example, see Hummers et al, Preparation of graphitic oxide. *J. Am. Chem. Soc.,* 80, 1339 (1958) and Schniepp, H. C. et al., Functionalised single graphene sheets derived from splitting graphite oxide, *J. Phys. Chem. B,* 110, 8535-8539 (2006)). The prerequisites that enable the preparation of so called bulk graphene are complete oxidation of graphite and extreme rapid heating of the resulting GO. The complete oxidation of graphite produces stoichiometric GO. This well-known process adds oxygen-based chemical groups to the graphite surface, for example, selected from epoxide, hydroxyl and carboxylic acid groups, and results in the bulk graphite being completely separated into single sheets. However, these single sheets are at most partially stable and only in alkaline solution in the presence of a large excess of ions (e.g. 0.01 to 1M sodium hydroxide) which is undesirable for most applications. It would therefore be desirable to have dispersions comprising single sheets or few-layer sheets that are not required to be stabilised in an alkaline medium with a high concentration of ions because the presence of excess ions can interfere with the electronic properties of the graphene sheets.

Niyogi, S. et al in Solution properties of graphite and graphene. *J. Am. Chem. Soc.,* 128 7720-7721 (2006) describe the attempted functionalisation of fully oxidised graphite oxide with octadecylamine at 120° C. and attempted redispersion in organic solvents. However, the achievable concentration of dispersed functionalised graphene sheets was low.

Stankovich et al. in Synthesis and exfoliation of isocyanate-treated graphene oxide nanoplatelets, *Carbon,* 44 3342-3347 (2006), and Graphene-based composite materials. *Nature,* 442 (2006), 282-286, describe the functionalisation of fully oxidised GO sheets with organic isocyanate groups in DMF and reported a dispersability of up to 1 mg/mL. However, the sheets are not readily dispersible in non-polar solvents. This method itself depends on the presence of a sufficiently high density of hydroxyl groups and carboxylic acid groups to react with the isocyanate to form carbamides. According to the work of the present inventors this method is not suitable for GO which is not fully oxidised due to the much lower density of hydroxyl groups.

Strong surface-surface attraction between graphene sheets prevents them from forming stable dispersions in solvent systems and 3D graphite reforms from the stacking of the graphene sheets. Therefore, a challenge to find a process that yields a uniform or substantially uniform distribution of single graphene sheets remains.

In view of the above, there remains a need to find a way to make stable, highly concentrated dispersions comprising graphene containing sheets.

The present invention seeks to address at least some of the above challenges by controlling the degree of oxidation of graphite when forming graphite oxide and, optionally controlling the degree to which the surface of the graphite oxide is functionalised, and after such functionalisation optionally reducing the oxidation state of the graphene oxide to a desired value. Further it is an aim of this invention to: (i) make sub-stoichiometric GO materials; (ii) functionalise said sub-stoichiometric GO materials to render them more water soluble or more soluble in organic solvents by, for example, surface-grafting the GO with, for example, suitable solubilising groups; (iii) chemically reduce the functionalised materials for further applications.

SUMMARY OF INVENTION

The present invention provides a functionalised sub-stoichiometric graphene oxide wherein the graphene oxide surface has been modified with functional groups above a certain threshold or for example within a certain concentration range. The functional groups may be referred to herein as surface-grafted chains.

The concentration may be expressed in a number of ways. For example, the minimum concentration may be about 1 chain in 50 hexagonal units, or for example about 1 chain in 20 hexagonal units.

According to a first aspect of the present invention, there is provided a functionalised graphene oxide having a basal plane fraction of carbon atoms in the $sp^2$-hydrised state between 0.1 and 0.9, wherein the remainder fraction of carbon atoms comprises, consists essentially of or consists of $sp^3$-hybridised carbon atoms which are bonded to oxygen groups selected from hydroxyl and/or epoxy and/or carboxylic acid, and wherein the surface of the graphene oxide is functionalised with one or more functional groups at a concentration greater than one functional group per 100 carbon atoms, and less than one functional group per six carbon atoms.

According to an alternative aspect of the present invention, there is provided a material made of oxygen-containing graphene nanosheets characterised in that (i) the nanosheets are surface-grafted with organic-soluble or water-soluble components, (ii) the nanosheets can form stable dispersions at high concentrations in the appropriate organic or water-based solvents, and (iii) the ratio of oxygen atoms bonded to the graphene oxide nanosheet to the carbon atoms in the graphene nanosheet is sub-stoichiometric (that is O:C is less than 1:2). The stoichiometry of the graphene nanosheet may be determined by elementary analysis. In one embodiment, the stoichiometry of the GO material is $C_{2.0}H_{0.75}O_{0.77}$.

The ratio of the number of surface-grafted chains to the number of carbon atoms in the graphene oxide nanosheet may be smaller than 1:6 but larger than 1:100, for example smaller than 1:10 but larger than 1:50; for example smaller than 1:15 but larger than 1:30.

The ratio of the number of surface-grafted ionic, ionisable or water-soluble side chains to the number of carbon atoms in the graphene oxide nanosheet may be smaller than 1:6 but larger than 1:100, for example smaller than 1:10 but larger than 1:50; for example smaller than 1:15 but larger than 1:30.

The ratio of oxygen atoms bonded to the graphene oxide nanosheet to the carbon atoms in the oxygen-containing graphene nanosheet may be less than 1:2 but more than 0.1:2, for example less than 1:2 but more than 0.25:2, for example less than 1:2 but more than 0.5:2.

The functionalised graphene oxide or material made of oxygen-containing graphene nanosheets described above may be dispersible at higher than 5 mg/mL, for example, higher than 10 mg/mL, for example higher than 15 mg/mL, in the appropriate solvent without aggregating or precipitating over extended periods, for example up to about six months, at room temperature. Preferred organic solvents include tetrahydrofuran, chlorobenzene, dichlorobenzene, trichlorobenzene, ethanol or toluene.

According to a third aspect of the present invention, there is provided a functionalised graphite oxide comprising functionalised graphene oxide according to the other aspects of the invention.

According to a fourth aspect of the present invention, there is provided a liquid dispersion comprising functionalised graphite oxide according to the third aspect of the invention.

According to a fifth aspect of the present invention, there is provided a method of making the functionalised graphene oxide according to the first aspect of the invention comprising:

(i) oxidising graphite to form graphite oxide wherein the graphene sheets which make up the graphite independently of each other have a basal plane fraction of carbon atoms in the $sp^2$-hydridised state between 0.1 and 0.9, wherein the remainder fraction of carbon atoms comprises, consists essentially of or consists of $sp^3$-hybridised carbon atoms which are bonded to oxygen groups selected from hydroxyl and/or epoxy and/or carboxylic acid;

(ii) exfoliating and in-situ functionalising the graphite oxide surface with one or more functional groups such that functionalisation of the surface is effected at a concentration greater than one functional group per 100 carbon atoms, and less than one functional group per six carbon atoms.

The method of the fifth aspect of the invention may further comprise the step of deoxidising the functionalised graphite oxide, either in the dispersed state or on a solid substrate, by chemical reducing agents or heat treatment.

In the fifth aspect of the present invention, the functionalisation in (ii) may be carried out in an organic solvent. Suitable solvents include chlorobenzene, dichlorobenzene, trichlorobenzene and DMF.

The method according to the fifth aspect may comprise the further steps of forming a dispersion of functionalised graphite oxide which is optionally spun or printed to form a film comprising functionalised graphene oxide.

The fifth aspect of the invention may be adapted accordingly to make the various functionalised graphene oxides according to the present invention.

As mentioned above, the present invention provides a functionalised sub-stoichiometric graphene oxide wherein the graphene oxide surface has been modified with functional groups within a certain concentration range. The functionalised graphene oxide may be functionalised (or surface grafted) with components which render the graphene more water soluble or more organo soluble. The ratio of the number of surface grafted chains to the number of carbon atoms in the graphene oxide may be smaller than 1:6 and greater than 1:100, for example, smaller than 1:10 and greater than 1:50, for example smaller than 1:15 and greater than 1:30.

There are numerous advantages associated with the various aspects of the present invention, including excellent dispersability of the functionalised GO nanosheets at the single sheet level, for example greater than about 15 mg mL$^{-1}$ in organic solvents which is sufficient for spin coating and printing onto a variety of substrates. The films may then be readily deoxidised to graphene (e.g. about 80% completion at 300° C., or by chemical reduction) to give, for example, a network of low dimensional graphenite tracks and dots on the nanosheets. The sub-stoichiometry of the graphene oxide is important for the desired properties of these materials (for example, ease of deoxidation to substantially graphene, and the planarity of the nanosheets).

DETAILED DESCRIPTION OF THE INVENTION

Graphene Oxide

The sub-stoichiometric graphene oxide has a basal plane fraction of carbon atoms in the $sp^2$-hybridised state between 0.1 and 0.9. The remainder fraction of carbon atoms comprises, consists essentially of or consists of $sp^3$-hybridised carbon atoms which are bonded to oxygen groups selected from hydroxyl and/or epoxy and/or carboxylic acid. The graphene oxide formed may be referred to as sub-stoichiometric. Preferably, the oxidation state of the graphite oxide prior to functionalisation is such that the fraction of carbon atoms in the $sp^2$-hybridised state is between 0.1 and 0.4. Corresponding to this range of oxidation states, if the bonded oxygen groups exist primarily as epoxy (i.e., —O—), the oxygen to carbon ratio of the basal plane material is thus more than 0.3 and less than 0.5.

GO can be prepared in an unstable graphene-oxide nanosheet dispersion, and the present inventors have found that this can be readily functionalisable with various chemical groups to give fully stable nanosheet dispersions. In this application, the inventors will use the term "graphite oxide" and "graphene oxide" interchangeably, with both denoted by the same abbreviation "GO". Generally, "graphene oxide" refers to the material when it is in the un-aggregated nanosheet form in dispersion, and "graphite oxide" refers to the material when in the aggregated or dry solid form. However, there is no fundamental chemical difference between these, only its state of aggregation.

Furthermore, GO can be partially or fully oxidised depending on the oxidation process conditions. An ideal "stoichiometric" GO is given by two possible limiting formulae $C_2O_1$ if the oxygen is completely in the form of epoxy oxygen, and $C_2O_2H_2$ if the oxygen is completely in the form of hydroxyl groups. The essential feature of a stoichiometric GO is that every carbon in the graphene basal plane is $sp_3$-hybridised, and so no pi-electrons are available to carry electrical current to give it a conductive or semiconductive property. Stoichiometric GO (also referred to as fully-oxidised GO) are therefore completely insulating. This also results in a characteristic large bandgap in their optical spectra. Sub-stoichiometric GO (also referred to as under-oxidised GO) on the other hand has fewer epoxy oxygens or hydroxyl groups than necessary to make the stoichiometric material. As a result, a fraction of the carbon atoms on the basal plane is in the $sp^2$-hybridised state and each of these atoms carries a pi-electron that can give rise to conducting or semiconducting properties, depending on the connectivity of these pi-electrons. If sufficiently connected, as is the case if adjacent $sp^2$-carbon atoms join up to give chains or larger domains, the sub-stoichiometric GO can be conducting or semiconducting. In preferred embodiments, the fraction of $sp^2$-carbon atoms is relatively large, for example at least 60% of the basal plane carbons. This means that the residual oxygen level is correspondingly low, and the material approaches the perfect graphene in composition. We also refer to such materials interchangeably as "graphenes" even though they are not perfect graphene in the strictest sense. A way to determine the oxidation state of graphene is through its absorption spectrum over the mid-infrared to visible (0.1-4.0 eV) region. Perfect graphene has a well known spectrum and absorption cross-section per carbon atom in the basal plane. On the other hand, GO also has a well-known spectrum with a wide band-gap (i.e., practically zero absorption cross-section in the same spectral region). The fraction of $sp^2$-hybridised carbons of GO is determined by the ratio of the area under the curve of the absorption spectrum of GO between (0.1-4 eV) to that of perfect graphite.

Sub-stoichiometric GO as defined herein is a material with an integrated absorption cross-section per carbon atom in the basal plane over the 0.1-4.0-eV region between 10 and 90% of that of graphene. This definition means that sub-stoichiometric GO has a fraction of between 10 to 90% of their basal-plane carbon atoms in the $sp^2$-hybridised states. As the fraction rises above 50% or so, the character of the sub-stoichiometric GO begins to crossover to that of graphenes, as described above.

Another way to determine the oxidation state (and hence the stoichiometry of the GO) is through curve-fitting of the carbon C1s core-level spectrum measured in X-ray photoelectron spectroscopy. The binding energy of $sp^3$-hybridised and $sp^2$-hybridised carbon lies at 285-286.2 eV. The small binding energy difference between $sp^3$ and $sp^2$ carbons (typically 0.22-0.5 eV) cannot be resolved. A progression of peaks is used to model the vibrational progression, secondary chemical shift effects, as well as asymmetry in these line shapes. Chemical bonding to oxygen leads to large primary chemical shifts of the carbon C1s binding energy: typically + 1.2 to 1.8 eV for C—O, +2.8 to 3.0 eV for C═O, and +3.8 to 4.3 eV for C(═O)—O which are therefore readily distinguishable. The 287.2 eV binding energy component is chemically distinct and characteristic of single oxygen-bonded carbon atoms in both epoxide and β-dihydroxyl groups. The chemical shift (+2.2 eV, relative to 285.0 eV) is higher than for isolated C—O groups due to secondary (or β) shift effects. The ratio of its integrated intensity to the sum of the components at 285.0-286.2 eV, after correcting for the alkyl hydrocarbon contribution from the functional materials, independently measured in fourier-transform infrared spectroscopy (FTIR), gives the fraction of oxidised carbon. The fraction of $sp^2$ carbons is then obtained as the difference of this ratio from unity.

The degree of functionalisation may be determined by using a combination of elemental microanalysis, infrared spectrometry and/or direct imaging using an atomic-force microscope (AFM) and high resolution cryogenic scanning tunneling microscope (STM). The degree of functionalisation also includes functionalisation at the perimeter of the basal plane of the graphene oxide. In particular, the infra red spectrum is recorded of a known mass of functionalising material in order to determine its absorption cross section. The infra red spectrum is recorded of a known mass (m) of functionalised GO. From an analysis of the spectra the amounts (n) of reacted functionalising materials in the functionalised GO is quantified. The number of moles of reacted functionalised materials is obtained by dividing the mass (n) by its molecular weight and the number of moles of GO is obtained by dividing the mass (m-n) by its molecular weight. The level of functionalisation per carbon atom is obtained by taking the ratio of the moles of reacted functionalising materials to the moles of GO.

Sub-stoichiometric graphite oxide (GO) may be made according to known techniques, such as Hummers method and the Staudenmaier method (Hummers et al, Preparation of graphitic oxide. *J. Am. Chem. Soc.,* 80 1339 (1958), and Schniepp, H. C. et al., Functionalised single graphene sheets derived from splitting graphite oxide, *J. Phys. Chem. B,* 110 8535-8539 (2006)). Essentially, this may involve reacting pure graphite with a strong oxidising agent optionally followed by purification. Typically, a mixture of strong acids is prepared, for example, a mixture of sulphuric and nitric acids. The temperature of the reaction may be maintained at about 0 to 5° C. during the addition of graphite. A strong oxidising agent may then be combined with the graphite containing mixture. By appropriate selection of the oxidising agent and the temperature of the oxidation reaction, it is possible to make GO possessing a range of oxidation states.

Suitable strong oxidising agents include potassium chlorate, potassium persulfate, ceric ammonium nitrate, hydrogen peroxide, periodic acid, potassium permanganate, potassium dichromate.

Functionalisation

Following oxidation, the graphite oxide comprises a number of oxygen containing groups. These groups may comprise epoxy and/or hydroxyl and/or carboxylic acid groups. These groups (i.e. —O—, OH, —COOH), are bonded directly to the carbon atoms of the graphene sheets making up the graphite oxide.

Suitable functionalising compounds include those which may render the graphite oxide more water soluble or more soluble in organic solvents. The functionalisation of the graphite oxide advantageously renders the resulting functionalised graphene oxide layers more stable in dispersed form.

The method of forming stable dispersions of functionalised GO may involve reaction of the GO with an organic soluble or water soluble component. Examples of organic-soluble components are alkyl, cycloalkyl, aryl, alkylaryl, amide, ester, ether, amine and sulphonamide-containing groups. Examples of water soluble components are carboxylate, sulphonate, phosphonate, quartenised ammonium groups or ionisable groups, such as amino, carboxylic acid, phosphonic acid, or other water-soluble groups such as alkylene ether chains of amide, ester, ether, amine and sulphonamide.

The functionalising compound may comprise a reactive head group, for example an amino group, or an alcohol group, or any other group that, for example, causes epoxide ring opening under mild conditions (e.g. in a solvent at temperatures<120° C.).

The functionalising compound may comprise a tail group. Suitable classes of tail groups include organic soluble alkyl, cycloalkyl, aryl and alkylaryl groups, and may also contain a functional group for surface energy modification such as an amide, ester, ether or sulphonamide which are preferably compatible with the head group.

Classes of suitable water soluble tails include short alkyl, cycloalkyl, or aryl chains containing carboxylate, sulphonate, phosphonate, quartenised ammonium groups or ionisable groups, such as amino, carboxylic acid, sulfonic acid, phosphonic acid, or their precursors, which are preferably compatible with the head group.

Suitable functionalising compounds include those of the formula $RNH_2$ wherein R is $C_3$ to $C_{24}$ branched or straight chain alkyl wherein the alkyl group may be further substituted. For example, R may be $HO(SO_2)(CH_2)_n$ wherein n may be 3 to 24.

Suitable surface-energy modification groups include fluorinated tails including perfluorophenyl and perfluoroalkyl chains.

For example, the GO may be exfoliated and functionalised in situ in dichlorobenzene with octadecylamine (ODA) at mild temperatures to give a black ODA-GO nanosheet dispersion which may be purified by repeated centrifugation and redispersion.

Advantageously, the present inventors have found that the formation of stable dispersed functionalised graphene oxide sheets may be achieved by reaction with mainly epoxy groups, which are the primary groups present on the surfaces of sub-stoichiometrically oxidised GO, as opposed to hydroxyl and carboxylic acid groups which appear to be more important as the oxidation conditions become more severe and complete or near complete oxidation occurs. For example, perimeter functionalisation through edge COOH groups is considered by the present inventors to be less relevant for the purposes of rendering a number of sheets dispersible.

Purification and Deposition of Layers

Methods of purification of solutions of functionalised graphite oxide solution may comprise repeated dispersion and centrifugation in organic solvents. Suitable organic solvents include tetrahydrofuran, chlorobenzene, dichlorobenzene, trichlorobenzene, ethanol or toluene.

A suitable method for purifying a functionalised graphite oxide solution may involve: (i) separation by size ranges of singly-dispersed nanosheets using one or more organic solvent; (ii) precipitation with polar or organic solvent; (iii) re-dispersion with polar solvent or organic solvent followed by centrifugation or filtration. Step (iii) may be repeated until the excess un-reacted functionalising materials are removed.

Optionally, the oxidation state of the dispersed functionalised graphene oxide layers may be reduced to increase the fraction of carbon atoms in the $sp^2$-hybridised state to more than when the GO is first formed, for example such that the fraction of $sp^2$-hybridised carbon atoms is between 0.4 and 0.9. Corresponding to this range of oxidation states, if the bonded oxygen atoms exist primarily as epoxy groups (i.e., —O—), the oxygen to carbon ratio of the basal plane material is thus less than 0.3 and more than 0.05.

When the fraction of atoms in the $sp^2$-hybridised state is greater than about 0.5, the electrical and thermal properties tend to become increasingly dominated by the pi electrons in the graphene network and the materials may be referred to as graphenes.

Methods of de-oxygenating/reducing functionalised GO solution may involve the use of chemical reducing agents.

A suitable method for de-oxygenating/reducing a functionalised GO solution may comprise the following steps: (i) re-dispersion of functionalised GO solution in an anhydrous organic solvent in an inert atmosphere; (ii) addition of chemical reducing agents in an inert atmosphere with or without the addition of heat and/or sonication; (iii) quenching of the reaction and precipitation with anhydrous polar or organic solvent; (iv) re-dispersion with anhydrous polar solvent or organic solvent followed by centrifugation or filtration. Step (iii) may be repeated until the excess chemical reducing agents are removed.

Classes of suitable chemical reducing agents include hydrazine, sodium borohydride and sodium naphthalenide, sodium anthracenide, sodium benzophenone, sodium acenaphthylenide, ferrocene, lithium aluminium hydride, lithium tris(tertbutoxy)aluminium hydride borane, 9-borabicyclo[3.3.1]nonane and diisobutylaluminium hydride. A particularly suitable reducing agent is lithium aluminium hydride.

A further suitable method for de-oxygenating/reducing functionalised GO solution involves the following steps: (i) re-dispersion of functionalised GO solution in high-boiling-point organic solvent (e.g. boiling-point above 200° C.); (ii) heating of the dispersion to above 200° C. and just below the boiling point; (iii) cooling and precipitation with polar or organic solvent; (iv) re-dispersion with polar solvent or organic solvent followed by centrifugation or filtration.

The stable dispersion of functionalised GO can be spin-coated or ink-jet printed to form single layer nanosheet containing films onto any planar substrates such as inorganic metal or semiconductor wafers, glass and plastics. More specifically, the stable dispersion of functionalised GO can be spin-coated or ink-jet printed to form films or nanosheets comprising a single layer of graphene onto any suitable planar substrates such as inorganic metal or semiconductor wafers, glass and plastics. Spinning a dispersion of concentration of functionalised graphite oxide of 0.3 mg/mL at 1000 rpm typically provides a film containing on average 1 monolayer of graphene sheets.

Further methods of reducing/deoxygenating functionalised GO when it is to be deposited on a substrate may involve chemical reducing agents such as hydrazine, sodium borohydride and sodium naphthalenide, sodium anthracenide, sodium benzophenone, sodium acenaphthylenide ferrocene, lithium aluminium hydride, lithium tris(tertbutoxy)aluminium hydride borane, 9-borabicyclo[3.3.1]nonane and diisobutylaluminium hydride or by the application of heat.

With the methodologies and materials provided in accordance with the present invention it has become relatively straightforward to handle and process graphene dispersions into thin films of graphene nanosheets for electronic applications, or to make nanocomposites with other materials for mechanical applications. Further, these materials are solution-processable, for example by printing; thus opening opportunities for electronics on large and/or flexible substrates that take advantage of the 2D nature of these materials. Further, the present inventors have determined that sub-stoichiometric graphene oxide nanosheets and not stoichiometric graphene oxide nanosheets have the most interesting properties for a variety of technological applications. Accordingly, the present invention provides methods for the functionalisation and application of sub-stoichiometric graphene oxides. This has been achieved by functionalising graphene oxide nanosheets with groups that confer solution dispersability. Without such a functionalisation, the graphene oxide nanosheets if formed in dispersion, tend to re-aggregate and re-stack to give intractable graphite oxide particulates on account of the additive van der Waals interaction between the graphene oxide nanosheets. The present invention provides a method of preventing this.

For the avoidance of doubt, the present application relates to the subject-matter described in the following numbered paragraphs.

1. A material made of oxygen-containing graphene nanosheets characterised in that (i) the nanosheets are surface-grafted with organic-soluble or water-soluble components. (ii) the nanosheets can form stable dispersions at high concentrations in the appropriate organic or water-based solvents, and (iii) the ratio of oxygen atoms bonded to the graphene oxide nanosheet to the carbon atoms in the graphene nanosheet is sub-stoichiometric (that is O:C is less than 1:2).

2. A material of paragraph 1, wherein the surface-grafting is accomplished using alkyl or cycloalkyl or aryl or alkylaryl side chains, bonded to the oxygen-containing graphene nanosheets by direct C—C bond, amide linkage, ester linkage, ether linkage, amine linkage, sulphonamide linkage, to impact solubility in organic solvents.

3. A material of paragraph 1, wherein the surface-grafting is accomplished using short chains bearing ionic groups such as carboxylate, sulphonate, phosphonate, quartenised ammonium groups or ionisable groups, such as amino, carbooxylic acid, phosphonic acid, or other water-soluble groups such as alkylene ether chains, bonded to the oxygen-containing graphene nanosheets by direct C—C bond, amide linkage, ester linkage, ether linkage, amine linkage, sulphonamide linkage, to impact solubility in water-based solvents.

4. A material of paragraph 2, wherein the ratio of the number of surface-grafted chains to the number of carbon atoms in the graphene oxide nanosheet is smaller than 1:6 but larger than 1:100, more preferably smaller than 1:10 but larger than 1:50; and most preferably smaller than 1:15 but larger than 1:30.

5. A material of paragraph 3, wherein the ratio of the number of surface-grafted ionic, ionisable or water-soluble side chains to the number of carbon atoms in the graphene oxide nanosheet is smaller than 1:6 but larger than 1:100, more preferably smaller than 1:10 but larger than 1:50; and most preferably smaller than 1:15 but larger than 1:30.

6. A material of paragraph 1, wherein the ratio of oxygen atoms bonded to the graphene oxide nanosheet to the carbon atoms in the oxygen-containing graphene nanosheet is less than 1:2 but more than 0.1:2, preferably less than 1:2 but more than 0.25:2, and most preferably less than 1:2 but more than 0.5:2.

7. A material of paragraph 1, wherein the material is dispersible at higher than 5 mg/mL, preferably higher than 10 mg/mL, most preferably higher than 15 mg/mL in the appropriate solvent without aggregating or precipitating over extended periods at room temperature.

8. A material of paragraph 6, which can be subsequently de-oxygenated so that the ratio of oxygen atoms bonded to the oxygen-containing graphene nanosheet to the carbon atoms in the graphene nanosheet is ultimately less than 0.3:1, more preferably less than 0.2:1, most preferably less than 0.1:1.

9. A method of making the material of paragraph 1, by chemical oxidation of bulk graphite, followed by exfoliation and in-situ functionalisation with the desired surface-grafted components, followed by purification.

10. A method of making the material of paragraph 8, in which the de-oxygenation/reduction is accomplished by heating of the deposited film of material of paragraph 1 on the substrate to a temperature higher 150° C. or using chemical reducing agents.

11. A method of making the material of paragraph 8, in which the de-oxygenation is accomplished by chemical reduction of the material of paragraph 1 by chemical reducing agents such as hydrazine, sodium borohydride, sodium naphthalenide, sodium anthracenide, sodium benzophenone or sodium acenaphthylenide.

12. A method of making the material of paragraph 4, in which its solution can be spin-coated or ink-jet printed.
13. A method of making the material of paragraph 5, in which its solution can be spin-coated or ink-jet printed.
14. A method of paragraph 4 and 5 in which it can be spin-coated or ink-jet printing on any planar substrates such as inorganic metal or semiconductor wafers, glass and plastics.
15. The use of the material of paragraph 1 or paragraph 8 in electrically-conductive coatings or formulations.
16. The use of the material of paragraph 1 or paragraph 8 in heat-conductive coatings or formulations.
17. The use of the material of paragraph 1 or paragraph 8 in infrared-emitting coatings.
18. The use of the material of paragraph 1 or paragraph 8 as electrodes for devices.
19. The use of the material of paragraph 1 or paragraph 8 as the electrochemically-active electrode in batteries.
20. The use of the material of paragraph 1 or paragraph 8 as the semiconductor in field-effect transistors.

BRIEF DESCRIPTION OF DRAWINGS

The invention will now be described by way of example only with reference to the following drawings and examples in which.

Figure 3:
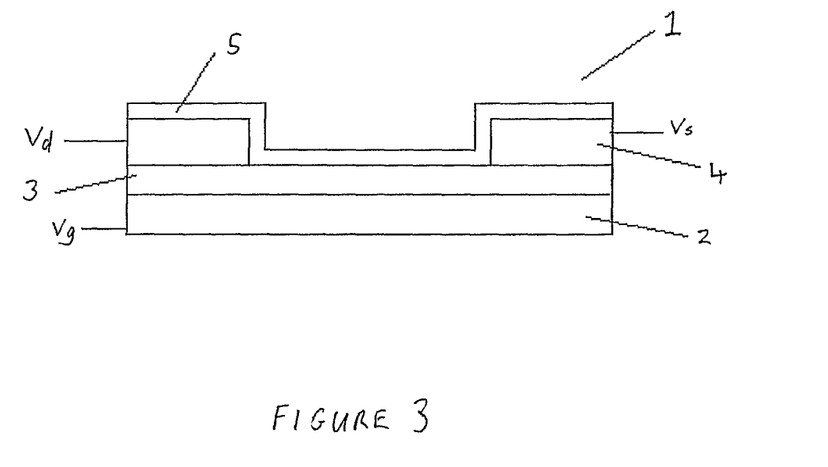
FIG. 3 illustrates a field effect transistor comprising a layer of graphene.

In FIG. 3 a graphene-based field effect transistor (1) is shown in side elevation. A gate dielectric film (3) of typical thickness between 5 and 200 nm formed over a conductive gate (2) on a substrate is provided with conductive source and drain electrodes (4). This is coated with a film (5) containing graphene nanosheets according to the present invention. Suitable materials for conductive gate (2) and conductive source and drain electrodes (4) are conductive polymers such as poly(3,4-ethylenedioxythiophene) and inert materials such as gold. Suitable materials for gate dielectric film (3) are insulators such as silicon oxide, divinyltetramethyldisiloxane-bis(benzocyclobutene) polymer, and fluoropolymers.

EXAMPLES

Example 1

Preparation of Graphene Oxide

The following preparation of graphene oxide is based on the Staudenmaier method. A conical flask equipped with a magnetic stir bar was charged with concentrated sulfuric acid (95-97%, 17.5 mL) and fuming nitric acid (90%, 9 mL), and cooled to 0-5° C. by immersion in an ice bath. Graphite powder (−325 mesh, >99.99%, Sigma-Aldrich, 1.0 g) was then added slowly with vigorous stirring. After the graphite powder was well dispersed into a black slurry, potassium chlorate (>99.0%, 11 g) was added slowly over 15 min and after 1 h, the mixture was allowed to warm to room temperature and stirred for 7 days. The mixture was poured into 1 L of Millipore water and filtered through a 0.2 μm PTFE membrane. The material was then re-dispersed and washed in 50 mL of 5% HCl (diluted from 33-36% HCl) followed by water until the pH of the filtrate was neutral according to pH indicator paper. The resultant dull grey GO material was then dried in a vacuum desiccator overnight at room temperature and stored in an ambient environment. Elementary analysis of the sub-stoichiometric graphene oxide gave $C_{2.0}H_{0.75}O_{0.77}$.

Figure 1:
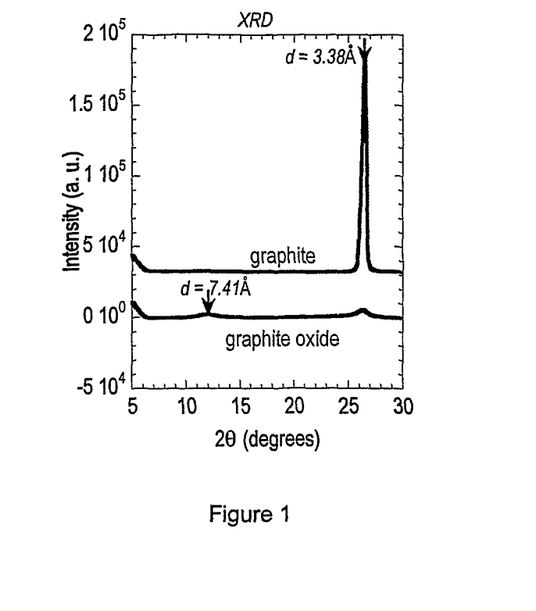
FIG. 1 is an X-ray diffraction of graphite oxide. This figure shows the scattering of X-rays from interplane spacings, and demonstrates the successful oxidation of graphite in accordance with the present invention as the first step prior to functionalisation.

Powder X-ray diffraction (Philips 1729) was done on the resultant GO material after it had been hydrated for 3 days in a $N_2$ environment (see FIG. 1). An average basal-plane spacing of 7.4 A was obtained.

Example 1a

The same procedure was used as in Example 1, but periodic acid (>99%, 8 g) was used in place of potassium chlorate.

Example 2

Functionalisation of Graphene Oxide

A mixture of 10 mg of GO, 100 mg of octadecylamine (ODA, 97% purity, Sigma-Aldrich) and 60 μL 1,3-diisopropylcarbodiimide (DIC, 99% purity, Sigma-Aldrich) was mixed with 5 mL of dichlorobenzene (99.8% purity, Romil) in a borosilicate glass reaction vial, purged with $N_2$ and heated with intermittent sonication to 80° C. for 24 h under $N_2$ to give a homogeneous black dispersion. A repeated dispersion and centrifugation with tetrahydrofuran, ethanol followed by toluene was performed to obtain/extract the functionalised graphite oxide (ODA-GO).

Example 2a

A mixture of 10 mg of GO, 100 mg of octadecylamine (ODA, 97% purity, Sigma-Aldrich) and 60 μL N,N'-dicyclohexylcarbodiimide was mixed with 5 mL of dichlorobenzene (99.8% purity, Romil) in a borosilicate glass reaction vial, purged with $N_2$ and heated with intermittent sonication to 80° C. for 24 h under $N_2$ to give a homogeneous black dispersion. A repeated dispersion and centrifugation with tetrahydrofuran, ethanol followed by toluene was performed to obtain/extract the ODA-GO.

Example 2b

A mixture of 10 mg of GO and 100 mg of octadecylamine (ODA, 97% purity, Sigma-Aldrich) plus 60 μL 1,3-diisopropylcarbodiimide (DIC, 99% purity; or N,N'-dicyclohexylcarbodiimide, DCC, 99% purity) was mixed with 5 mL of dichlorobenzene (99.8% purity) in a borosilicate reaction (22 ml) vial in glovebag purged with $N_2$. This mixture was heated and stirred to 80° C. for 24-72 h to give a homogeneous black dispersion. The reaction mixture was then sonicated for 2 hrs in an oil bath maintained at 80° C. The crude mixture contains the desired octadecylamine functionalised graphite oxide (ODA-GO) which is present as single sheets of functionalised graphene oxide in suspension, but contaminated with a small quantity of un-exfoliated material which give large particles (up to micron-sized), nanoparticles (diameter 1-2 nm), as well as large amounts of excess ODA and DIC or DCC. These contaminants can be removed by repeated centrifugation and re-dispersion or repeated vacuum filtration and re-dispersion (see Example 3). The dispersion thus obtained was stable for more than 6 months at room temperature.

Example 2c

A mixture of 11.11 mg (or 10 mg) OG and 115 mg (or 100 mg) ODA was mixed in 5 mL N,N-dimethylformamide (DMF) in a borosilicate glass reaction vial, purged with $N_2$ and heated to 80° C. for 24 h under $N_2$ to give a homogeneous black dispersion. A repeated dispersion and centrifugation with tetrahydrofuran, ethanol followed by toluene was done to obtain the ODA-GO. A repeated dispersion and centrifugation with tetrahydrofuran, ethanol followed by toluene was performed to obtain/extract the ODA-GO.

Example 2d

A mixture of 11.11 mg (or 10 mg) GO and 115 mg (or 100 mg) ODA was mixed in 5 mL N,N-dimethylformamide (DMF) in a borosilicate glass reaction (22 ml) vial in a glovebag purged with $N_2$. The mixture was heated and stirred to 80° C. for 24 h to give a homogeneous black dispersion. The crude product was purified as in Example 3.

Example 2e

A mixture of 10 mg of GO and 100 mg of 3-amino-1-propanesulfonic acid (APS, 97% purity) and with 60 μL 1,3-diisopropylcarbodiimide (DIC, 99% purity; or N,N'-dicyclohexylcarbodiimide, DCC, 99% purity) was mixed with 5 mL of dimethylformamide (99.8% purity) in a borosilicate glass reaction (22 ml) vial containing magnetic stirrer in a glovebag purged with $N_2$. This mixture was heated and stirred to 80° C. for 24-72 h to give a homogeneous black dispersion. The reaction mixture was then sonicated for 2 hrs in an oil bath maintained at 80° C. This crude material contains the desired APS functionalised graphite oxide (APS-GO) single sheets in suspension, but contaminated with a small quantity of un-exfoliated materials which give large particles e.g. nanoparticles (typical diameter 1-2 nm and as large as a few microns), as well as large amounts of excess APS and DIC. These contaminants can be removed by repeated centrifugation and re-dispersion or repeated vacuum filtration and re-dispersion in aqueous alcohols, following the principle of Example 3. The dispersion which was obtained was stable for more than 6 months at room temperature.

Example 3

Purification of Functionalised GO 0.25 mL of crude ODA-GO was extracted into a 7 ml vial and homogeneously mixed with 1 mL of THF (>99.9% purity, HPLC grade) and sonicated for 30 mins. This mixture was centrifuged at 8000 revolutions per min (8000 rpm, corresponding to 5580 g) for 30 min to separate out the un-exfoliated materials. The aggregated particles were centrifuged out as the precipitate (i.e., centrifugate), while the ODA-GO single sheets remained in suspension in the dark supernatant together with nanoparticles and excess ODA and DIC or DCC. 0.75 ml of the supernatant was extracted and mixed with 5 mL of ethanol (>99.8% purity, HPLC grade) in centrifuge tubes to cause aggregation of the ODA-GO sheets so as to purify these ODA-GO single sheets from the nanoparticles and excess ODA and DIC or DCC. The precipitated ODA-GO was collected by centrifuge at 8000 rpm for 30 min. The sediment was typically diffuse and spread over the sidewalls of the centrifuge tube. The colourless supernatant which contained dissolved ODA and DIC was discarded. A second portion of 5 mL of ethanol was added to the black centrifugate of ODA-GO. To wash this thoroughly, the mixture was sonicated for 20 min and then centrifuged at 8000 rpm for 20 min to collect the ODA-GO, and the supernatant discarded. A third portion of 5 mL of ethanol was added, and the washing repeated once more, and the supernatant discarded. Finally, 1 mL toluene was added to the centrifugate, sonicated for 30 min, and centrifuged at 8000 rpm for 30 min. The centrifugate was collected and the light-coloured supernatant was discarded. To prepare the ODA-GO dispersion in THF, 1.0 mL of THF was added to this centrifugate and sonicated for 30 min to give a black dispersion. This dispersion was stable for more than 6 months (i.e., no precipitation) when kept in an amber vial in ambient conditions. This dispersion could be spin-coated at 1000 rpm on $O_2$ plasma treated (10 min) thermal oxide to give a film of single-sheets.

Example 3a 0.25 mL of crude ODA-GO was extracted into a 7 ml vial and homogeneously mixed with 1 mL of THF (>99.9% purity, HPLC grade) and sonicated for 30 mins. This mixture was centrifuged at 8000 revolutions per min (8000 rpm, corresponding to 5580 g) for 30 min to separate out the un-exfoliated materials. The aggregated particles were centrifuged out as the precipitate (i.e., centrifugate), while the ODA-GO single sheets remained in suspension in the dark supernatant together with nanoparticles and excess ODA and DIC or DDC. 0.75-0.80 ml of the supernatant was extracted. This supernatant was washed several times with ethanol followed by toluene using vacuum filtration. To prepare the ODA-GO dispersion in THF, 1.0 mL of THF was added to this centrifugate and sonicated for 30 min to give a black dispersion. This dispersion was stable for more than 6 months (i.e., no precipitation) when kept in an amber vial in ambient conditions. This dispersion could be spin-coated at 1000 rpm on $O_2$ plasma treated (10 min) thermal oxide to give a film of single-sheets. The dispersion concentration may typically be up to 15 mg/mL.

Example 4

Preparation of Reduced Functionalised Graphene Oxides Dispersion by Reduction with Chemical Reducing Agents ODA-GO was re-dispersed into anhydrous tetrahydrofuran (THF, 0.32 mg/mL) by a brief sonication (few minutes) in a nitrogen glove bag. 110 μL of lithium aluminium hydride (1.0M) was added and reacted at 65° C. for 3 h. The reduced graphene oxide remained dispersed in the THF. Anhydrous ethanol was added to quench the reaction and precipitate the reduced graphene oxide by centrifugation. The supernatant was removed, and the reduced graphene oxide was purified by re-dispersion in anhydrous ethanol with sonication and re-centrifugation, (repeated three times).

Example 4a

ODA-GO was re-dispersed into anhydrous tetrahydrofuran (THF, 1 mg/mL) in a nitrogen glove bag followed by a brief sonication (few minutes). 50-250 μL of 9-borabicyclo[3.3.1]nonane (1.0M) was added and reacted at 65° C. for 3 h with sonication. The reduced graphene oxide remained dispersed in the THF. Anhydrous ethanol was added to quench the reaction and precipitate the reduced graphene oxide by centrifugation. The supernatant was removed, and the reduced graphene oxide was purified by re-dispersion in anhydrous ethanol with sonication and re-centrifugation, (repeated three times).

Example 4b

ODA-GO was re-dispersed into anhydrous tetrahydrofuran (THF, 1 mg/mL) in a nitrogen glove bag followed by a brief sonication (few minutes). 50-250 μL of lithium aluminium hydride (1.0M) was added and reacted at 65° C. for 3 h with sonication. The reduced graphene oxide remained dispersed in the THF. Anhydrous ethanol was added to quench the reaction and precipitate the reduced graphene oxide by centrifugation. The supernatant was removed, and the reduced graphene oxide was purified by re-dispersion in anhydrous ethanol with sonication and re-centrifugation, (repeated three times).

Example 4c

ODA-GO was re-dispersed into anhydrous tetrahydrofuran (THF, 0.32 mg/mL) in a nitrogen glove bag followed by a brief sonication (few minutes). 110 μL of sodium acenaphthylenide (1.0M) was added and reacted at room temperature for 6 h. The reduced graphene oxide remained dispersed in the THF. Anhydrous ethanol was added to quench the reaction and precipitate the reduced graphene oxide by centrifugation. The supernatant was removed, and the reduced graphene oxide was purified by re-dispersion in anhydrous ethanol with sonication and re-centrifugation, (repeated three times).

Example 5

Preparation of Reduced Functionalised Graphene Oxides Dispersion by Thermal Heating ODA-GO was re-dispersed into trichlorobenzene (TCB, 0.32 mg/mL) in a nitrogen glove bag followed by a brief sonication (few minutes). This dispersion was thermally heated for 25 h. Anhydrous ethanol was added to quench the reaction and precipitate the reduced graphene oxide by centrifugation. The supernatant was removed, and the reduced graphene oxide was purified by re-dispersion in anhydrous ethanol with sonication and re-centrifugation, (repeated three times).

Example 6

Fabrication of Field-Effect Transistors by Thermal De-Oxidation 0.32 mg/mL of ODA-GO in tetrahydrofuran was prepared and sonicated for a few minutes. 200 nm thick p++ silicon oxide substrate, pre-patterned with gold source-drain electrodes, was oxygen plasma cleaned for 10 min. The solution was spin-coated at 1000 rpm to give a 2-nm-thick "monolayer" film of the solution-processed graphenes. This film was heated at 300° C. for 15 min in the nitrogen glovebox to thermally de-oxidise the graphene oxide to graphene to provide field-effect transistors. These field effect transistors show effective mobility>10 $cm^2\ V^{-1}\ s^{-1}$ and can be operated in ambient conditions continuously for days in either of the p- and/or n-channel regimes.

Example 6b 0.32 mg/ml of ODA-GO in tetrahydrofuran was prepared and sonicated for a few minutes. 200 nm thick p++ silicon oxide substrate pre-patterned with gold source-drain electrode and oxygen plasma was cleaned for 10 minutes. The solution was spin-coated at 1000 rpm onto this substrate. The device was heated at 180° C. for 15 minutes and the field-effect behaviour was measured.

Example 7

Fabrication of Field-Effect Transistors by Chemical De-Oxidation

The device was made following the procedure in Example 6, but instead of thermal de-oxidation, the film was chemically deoxidised by lithium aluminium hydride (1.0 M) in 100 ml tetrahydrofuran (THF) for 6 h.

Example 8

Fabrication of a Conductive Layer and its Applications

A dispersion of the reduced graphene nanosheets was deposited onto the substrate surface to give a multilayered film. Deposition can be done by various methods including spray coating (such as from a dispersion of 1-15 mg/mL in tetrahydrofuran), spin-coating, and inkjet printing. Conductivity up to $1\times10^{-2}$ S sq can be obtained depending on film thickness. Usually, this requires film thickness of more than 10 microns. Lower conductivity down to $10^{-9}$ S sq can be obtained by making thinner films of the more oxidized materials. Usually, the film thickness can be small, in the region of less than 100 nm.

These films are useful for electromagnetic screening of the substrate. For this application, the film usually needs to be thick enough to have a conductivity of greater than $10^{-9}$ S/sq.

These films are also useful for resistive heating of the substrate. Depending on the desired resistance, the film thickness and composition can be adjusted accordingly.

The films are also useful for controlled infrared emission and signature masking of the underlying substrate. For this application, the film usually needs to be thick enough to block the infrared emission of this underlying substrate. This means that the film usually needs to be at least 100 nm thick, depending on its exact dielectric function, which varies with stoichiometry and functionalisation. A substrate coated in this way will exhibit the emission spectrum and emissivity of the sub-stoichiometric graphene oxide coating which is a broadband emitter covering from far-infrared radiation with wavelength longer than 20 microns to optical wavelengths as short as 450 nm. By tuning the composition and thus conductivity of this sub-stoichiometric GO, it is possible to achieve a tunability of the infrared emissivity and spectrum of the surface.

The films are also useful for infrared reflection (R>50% in the 100-1000 $cm^{-1}$ region) for "hot mirrors". The films are robust and can survive heating in air to well above 300° C.

Example 9

Figure 2:
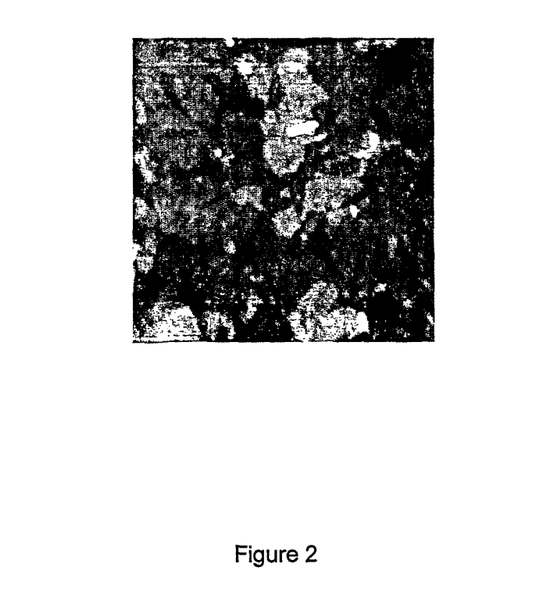
FIG. 2 is spin coated layer nanosheet of ODA-GO film.

Single-Layer Functionalised GO Nanosheets 0.32 mg/ml of ODA-GO in tetrahydrofuran was prepared and sonicated for a few minutes. The solution was spin-coated at 3000 rpm onto silicon oxide which had been surface pre-cleaned for 10 minutes with $NH_4OH:H_2O_2:H_2O$. FIG. 2 illustrates the single-layer functionalised GO nanosheets formed.

Example 10

Reduction of Single-Layer Functionalised GO Nanosheets to Graphene 0.32 mg/ml of ODA-GO in tetrahydrofuran was prepared and sonicated for a few minutes. The solution was spin-coated at 1000 rpm onto a silicon oxide surface which had been pre-cleaned for 10 minutes with $NH_4OH:H_2O_2:H_2O$ for four times. This film was dipped into a solution of 1 ml hydrazine hydrate in 100 ml dimethylformamide (DMF) for 4 h.

Example 11

Functionalised GO Field-Effect Transistor 0.32 mg/ml of ODA-GO in tetrahydrofuran was prepared and sonicated for a few minutes. 200 nm thick p++ silicon oxide substrate pre-patterned with gold source-drain electrode and oxygen plasma was cleaned for 10 minutes. The solution was spin-coated at 1000 rpm onto this substrate. The device was heated at 180° C. for 15 minutes and the field-effect behaviour was measured.

The invention claimed is:

1. A functionalised graphene oxide having a basal plane fraction of carbon atoms in the $sp^2$-hybridized state between 0.4 and 0.9, wherein the remainder fraction of carbon atoms which are bonded to oxygen groups selected from hydroxyl and/or epoxy and/or carboxylic acid, and wherein the surface of the graphene oxide is functionalized with one or more functional groups at a concentration greater than one functional group per 100 carbon atoms, and less than one functional group per six carbon atoms and the graphene oxide has been functionalised with a compound of the formula $HO(SO_2)(CH_2)_nNH_2$, wherein n is 3 to 24, and the one or more functional groups are selected from the group consisting of alkyl, cycloalkyl, aryl, alkylaryl, amide, ester, ether, amine, sulphonamide, carboxylate, and phosphonate.

2. A functionalised graphite oxide according to claim 1 in the form of a liquid dispersion.

3. A layer of functionalised graphene formed on a substrate from the liquid dispersion of functionalised graphite oxide of claim 2.

4. An electronic device comprising a functionalised graphene oxide according to claim 1.

5. A thin-film coating comprising a functionalised graphene oxide according to claim 1.

6. A method of making the functionalized graphite oxide according to claim 1 comprising:
(i) oxidising graphite to form graphite oxide, wherein the graphene sheets which make up the graphite independently of each other have a basal plane fraction of carbon atoms in the $sp^2$-hydridised state between 0.1 and 0.9, wherein the remainder fraction of carbon atoms comprises $sp^3$-hybridised carbon atoms which are bonded to oxygen atoms present in one or more group selected from the group consisting of hydroxyl, epoxy, and carboxylic acid groups; and
(ii) exfoliating and in-situ functionalizing the graphite oxide surface with one or more functional groups such that functionalisation of the surface is effected at a concentration greater than one functional group per 100 carbon atoms, and less than one functional group per six carbon atoms.

7. A method according to claim 6, wherein in step (i) the graphite is oxidized to form graphite oxide, wherein the graphene sheets which make up the graphite independently of each other have a basal plane fraction of carbon atoms in the $sp^2$-hybridised state between 0.1 and 0.4.

8. A method according to claim 6, wherein the functionalised graphite oxide after functionalisation is reduced by a chemical reducing agent such that the fraction of carbon atoms in the $sp^2$-hybridised state is between 0.4 and 0.9.

9. A method according to claim 8, wherein the chemical reducing agent is selected from the group consisting of hydrazine, sodium borohydride and sodium naphthalenide, sodium anthracenide, sodium benzophenone, sodium acenaphthylenide, ferrocene, lithium alumninum hydride, lithium tris (tertbutoxy)aluminum hydride, borane, 9-borabicyclo[3.3.1] nonane, and diisobutylaluminum hydride.

10. A method according to claim 6, wherein the functionalised graphite oxide after functionalisation is reduced by thermal heating in solution to between 150 and 400° such that the fraction of carbon atoms in the $sp^2$-hybridised state is between 0.4 and 0.9.

11. A method according to the claim 6, wherein the functionalised graphite oxide is formed into a dispersion.

12. A method according to claim 6, wherein the functionalised graphite oxide is reduced.

13. A method according to claim 6, wherein the dispersion of functionalized graphite oxide or reduced functionalised graphite oxide is spun, printed or coated onto a substrate.

14. A method according to claim 13, wherein the functionalisation of the surface is effected at a concentration greater than one functional group per 50 carbon atoms, and less than one functional group per 10 carbon atoms.

15. An electrically conductive coating or formulation comprising the material according to claim 1.

16. A heat-conductive coating or formulation comprising the material according to claim 1.

17. An infrared-emitting coating comprising the material according to claim 1.

18. A device including electrodes comprising the material according to claim 1.

19. A battery including electrochemically-active electrode comprising the material according to claim 1.

20. A field-effect transistor comprising the material according to claim 1 as a semiconductor in the field-effect transistor.

* * * * *